US012534326B2

(12) United States Patent
Otsuka et al.

(10) Patent No.: US 12,534,326 B2
(45) Date of Patent: Jan. 27, 2026

(54) RECORDING DEVICE

(71) Applicant: SEIKO EPSON CORPORATION, Tokyo (JP)

(72) Inventors: Kazuo Otsuka, Azumino (JP); Takuya Tsukatsune, Matsumoto (JP); Shun Ito, Matsumoto (JP); Mitsuru Murata, Matsumoto (JP); Atsuhiko Takeuchi, Matsumoto (JP); Yosuke Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 29 days.

(21) Appl. No.: 18/751,659

(22) Filed: Jun. 24, 2024

(65) Prior Publication Data

US 2024/0425317 A1 Dec. 26, 2024

(30) Foreign Application Priority Data

Jun. 26, 2023 (JP) ................................ 2023-104343

(51) Int. Cl.

| | |
|---|---|
| ***B65H 29/14*** | (2006.01) |
| ***B41J 13/10*** | (2006.01) |
| ***B65H 29/12*** | (2006.01) |
| ***B65H 31/02*** | (2006.01) |

(52) U.S. Cl.

CPC ............ *B65H 29/14* (2013.01); *B41J 13/106* (2013.01); *B65H 29/125* (2013.01); *B65H 31/02* (2013.01); *B65H 2404/1441* (2013.01)

(58) Field of Classification Search

CPC ...... B65H 29/14; B65H 29/125; B65H 31/32; B65H 2404/144; B65H 2553/61; B65H 43/02

See application file for complete search history.

(56) References Cited

U.S. PATENT DOCUMENTS

| | | | | |
|---|---|---|---|---|
| 5,462,265 A * | 10/1995 | Mandel | .................. | B65H 31/36 414/789.9 |
| 7,866,647 B2 * | 1/2011 | Terao | ..................... | B65H 31/26 270/58.11 |
| 10,479,636 B2 * | 11/2019 | Nakano | .................. | B65H 29/20 |
| 11,174,120 B2 * | 11/2021 | Chang | .................... | B65H 31/30 |
| 11,745,966 B2 * | 9/2023 | Shirasaki | ................. | B65H 7/02 271/127 |
| 2022/0063305 A1 | 3/2022 | Ito | | |

FOREIGN PATENT DOCUMENTS

JP 2022-038686 A 3/2022

* cited by examiner

*Primary Examiner* — Patrick Cicchino

(74) *Attorney, Agent, or Firm* — WORKMAN NYDEGGER

(57) ABSTRACT

A recording device includes a recording section, a discharge section 38 that discharges the medium, a pivot shaft 39 that pivots the discharge section 38, a contact member 48 that configure to swing around the pivot shaft 39 and to contact the medium to be discharged, and a detection section 45 that detects a displacement of the contact member 48, wherein the contact member 48 is provided with a swing restriction section 58 that restricts a range of swinging by engaging the protrusion 57 on the pivot shaft 39, a position of the protrusion 57 that engages with the swing restriction section 58 changes according to pivot the pivot shaft 39, and a position at which the contact member 48 is swingable changes between when the discharge section 38 is positioned at a nip position P1 and when the discharge section 38 is positioned at a non-nip position P2.

8 Claims, 6 Drawing Sheets

RECORDING DEVICE

The present application is based on, and claims priority from JP Application Serial Number 2023-104343, filed Jun. 26, 2023, the disclosure of which is hereby incorporated by reference herein in its entirety.

BACKGROUND

1. Technical Field

The present disclosure relates to a recording device such as a printer.

2. Related Art

For example, there is a recording device such as JP-A-2022-38686 that prints by ejecting liquid from a recording section. The recording device is equipped with a drive roller, a driven roller, a second pivot shaft, which is an example of a pivot shaft, and a stacking detection mechanism. The stacking detection mechanism has an activation member, a transmission member, a first contact member, and a detection auxiliary member.

A stacker, which is an example of a medium accommodation device, is detachably attached to the recording device. In a state where the stacker is not attached, the driven roller is in a position that is distant far apart from the drive roller.

When the medium is discharged to the stacker, the driven roller moves to a position where the medium can be nipped between the driven roller and the drive roller by pivoting the second pivot shaft. The stacking detection mechanism moves the detection auxiliary member to the detection position in conjunction with a movement of the driven roller, and becomes a state in which the stacking amount of the medium stacked on the stacker can be detected.

In JP-A-2022-38686, when the first contact member pivots around the second pivot shaft, the displacement of the stacked amount of the medium is transmitted via the activation member, the transmission member, and the detection auxiliary member. Therefore, the recording device has a large number of parts and a complicated structure.

SUMMARY

A recording device that solves the above problem includes a recording section that performs recording on a medium; a discharge section that nips and discharges the medium that was recorded on; a pivot shaft that pivots the discharge section between a nip position, where the medium is nippable, and a non-nip position, where the medium is not nippable; a contact member that is configured to swing around the pivot shaft and to contact the medium to be discharged; and a detection section that detects displacement of the contact member, wherein the pivot shaft has a protrusion that engages with the contact member, the contact member is provided with a swing restriction section that restricts range of swing by engaging with the protrusion, a position where the protrusion engages with the swing restriction section changes with pivoting of the pivot shaft, and a position where the contact member is swingable changes between when the discharge section is positioned in the nip position and when the discharge section is positioned in the non-nip position.

DESCRIPTION OF EMBODIMENTS

Embodiment

Hereinafter, an embodiment of a recording device and a recording system equipped with a recording device will be described with reference to the figures. The recording device is, for example, an inkjet printer that records by ejecting ink, which is an example of liquid, onto a medium such as paper, fabric, or vinyl.

In the figures, the direction of gravity is indicated by a Z-axis, and directions along the horizontal plane are indicated by an X-axis and a Y-axis, assuming that a recording system 11 is placed on a horizontal plane. The X-axis, Y-axis, and Z-axis are orthogonal to each other. In the following description, a direction parallel to the X-axis is also referred to as a width direction X.

Recording System

Figure 1:
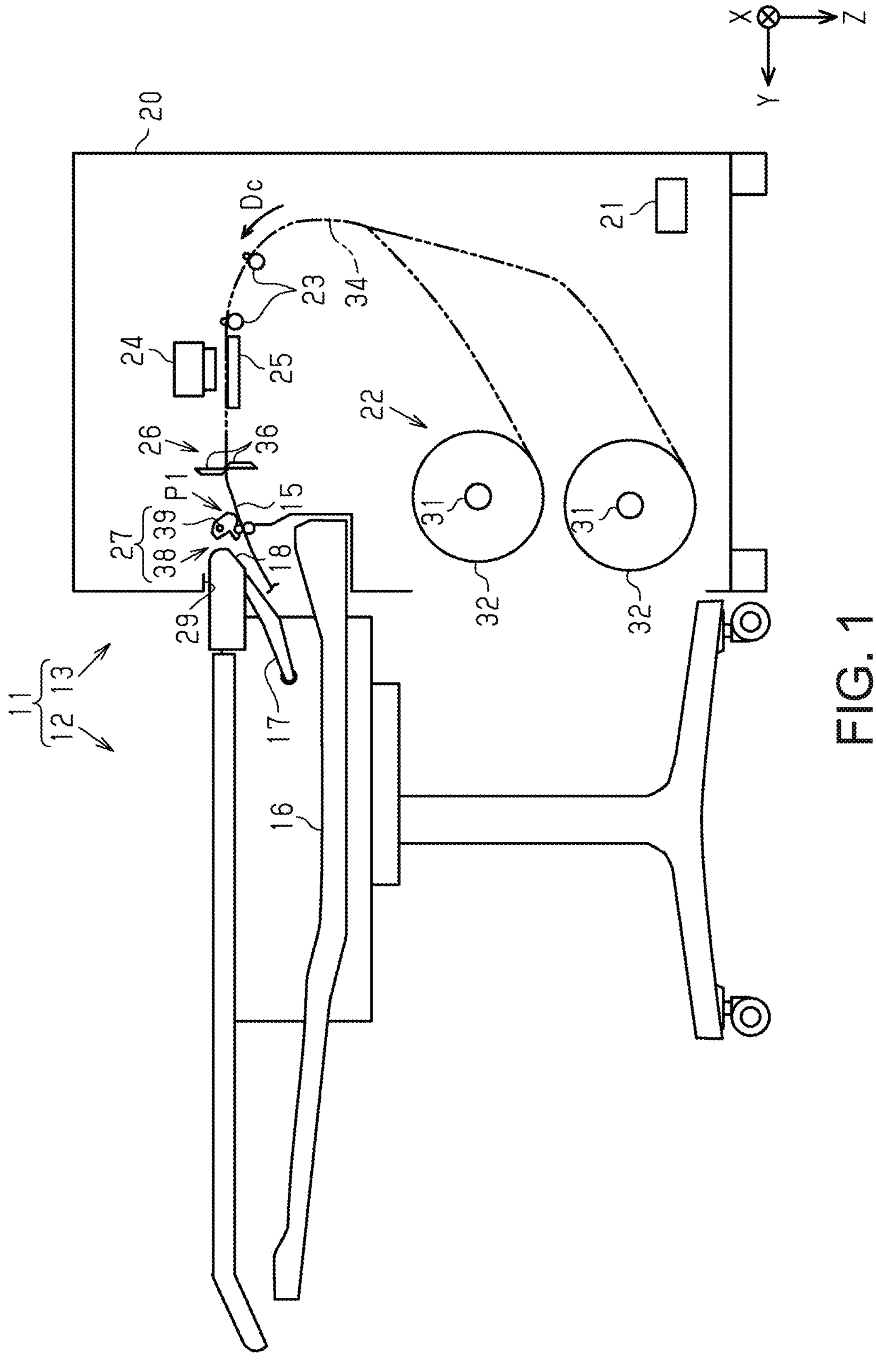
FIG. 1 is a schematic diagram of one embodiment of a recording system.

As shown in FIG. 1, the recording system 11 is equipped with a medium accommodation device 12 and a recording device 13.

Medium Accommodation Device

The medium accommodation device 12 is detachably attached to the recording device 13. The medium accommodation device 12, which is attached to the recording device 13, can stack the medium 15 being discharged from the recording device 13. The medium accommodation device 12 may have a discharge tray 16, a pressing section 17, and an arm 18.

The discharge tray 16 receives the medium 15 being discharged from the recording device 13. The recorded medium 15 is stacked on the discharge tray 16.

The pressing section 17 presses the medium 15 stacked on the discharge tray 16.

When the medium accommodation device 12 is attached to the recording device 13, the arm 18 may be inserted into the recording device 13 to position the medium accommodation device 12 with respect to the recording device 13. The arm 18 may contact the recording device 13 in a state where the medium accommodation device 12 is attached to the recording device 13.

Recording Device

The recording device 13 may have a housing 20, a control section 21, a feed-out section 22, a transport section 23, a recording section 24, a support section 25, a cutting section 26, and a discharge mechanism 27.

The housing 20 houses various components of the recording device 13. The housing 20 may have a discharge port 29 through which the recorded medium 15 is discharged. The medium accommodation device 12 may be attached to the discharge port 29.

The control section 21 overall controls a drive of each mechanism in the recording device 13 and controls the various operations performed by the recording device 13.

The control section 21 may be configured as a circuit including α: one or more processors that execute various processes according to a computer program, β: one or more dedicated hardware circuits that execute at least a part of various processes, or γ: a combination thereof. The hardware circuit is, for example, an application specific integrated circuit. The processor includes a CPU and memory, such as a RAM and ROM, wherein the memory stores program code or instruction that are configured to cause the CPU to perform the process. The memory, that is, a computer readable medium, includes any readable medium that can be accessed by a general purpose or dedicated computer.

The feed-out section 22 may have one or more feed-out shafts 31. The feed-out shaft 31 rotatably supports the roll body 32. The roll body 32 is formed by winding a long medium 15 into a cylindrical shape. The feed-out shaft 31 feeds out the medium 15 by rotating the roll body 32. If the feed-out section 22 has a plurality of feed-out shafts 31, the feed-out section 22 rotates one feed-out shaft 31 that supports the medium 15 to be fed out.

The transport section 23 transports the medium 15 along a transport path 34, which is indicated by a two dotted chain line in FIG. 1. The transport section 23 may transport the medium 15 by nipping the medium 15 between a pair of rotating rollers. The transport section 23 transports the medium 15 in a transport direction Dc. The transport direction Dc is a direction along the transport path 34.

The recording section 24 performs recording on the medium 15. The recording section 24 may perform recording on the medium 15 by ejecting liquid from a nozzle (not shown).

The support section 25 supports a portion of the long medium 15 that is to be recorded in the recording section 24.

The cutting section 26 is located downstream from the recording section 24 in the transport direction Dc. The cutting section 26 can cut the recorded medium 15 over the width direction X. The cutting section 26 may cut the medium 15 by moving the pair of cutting blades 36 in the width direction X.

Discharge Mechanism

As shown in FIG. 1, the discharge mechanism 27 may have a discharge section 38 and a pivot shaft 39.

Figure 2:
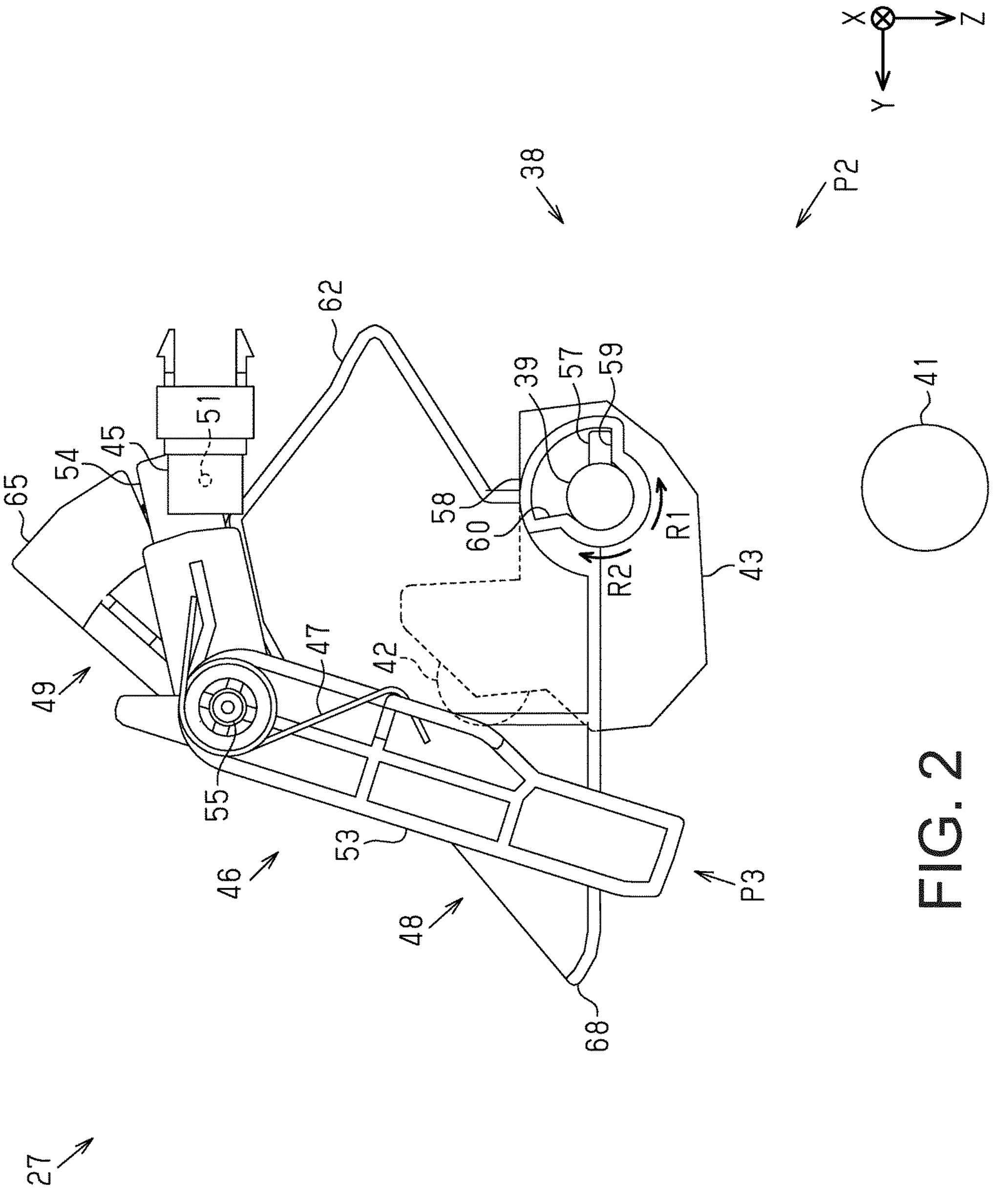
FIG. 2 is a side view of a discharge mechanism in which a mounting detection member is positioned in a non-mounting position.

As shown in FIG. 2, The discharge section 38 may have a discharge roller 41, a driven roller 42, and a holding section 43.

The discharge roller 41 rotates by a drive of a motor (not shown).

The driven roller 42 may be driven to rotate with respect to the discharge roller 41. The driven roller 42 may be a toothed roller. If the toothed roller is used for the roller that comes in contact with the recorded side surface of the medium 15, deterioration of the recording quality can be suppressed.

The holding section 43 rotatably holds the driven roller 42. The holding section 43 is fixed to the pivot shaft 39 so that it can rotate integrally with the pivot shaft 39. The term "pivot" refers to rotation around the pivot shaft, and a rotation whose pivotable angle is less than 360 degrees.

The pivot shaft 39 is pivotable in a first rotation direction R1 and in a second rotation direction R2. The first rotation direction R1 is a direction opposite to the second rotation direction R2. The pivot shaft 39 pivots the discharge section 38 to a nip position P1 shown in FIG. 1 and to a non-nip position P2 shown in FIG. 2. Specifically, the pivot shaft 39 moves the driven roller 42 by pivoting the holding section 43. If the pivot shaft 39 pivots in the first rotation direction R1 from the state where the discharge section 38 is positioned in the non-nip position P2, the holding section 43 and the driven roller 42 move to the nip position P1. When the pivot shaft 39 pivots in the second rotation direction R2 from a state where the discharge section 38 is positioned at the nip position P1, the holding section 43 and the driven roller 42 move to the non-nip position P2.

The nip position P1 is a position where the driven roller 42 is closer to the discharge roller 41. The nip position P1 is a position where the medium 15 can be nipped.

The non-nip position P2 is a position where the driven roller 42 is separated from the discharge roller 41. The non-nip position P2 is a position where the medium 15 cannot be nipped.

The discharge section 38 nips and discharges the recorded medium 15. The discharge section 38 may discharge the medium 15 from the discharge port 29 by nipping the medium 15 between the discharge roller 41 and the driven roller 42 and by rotating the discharge roller 41.

When the medium 15 is cut by the cutting section 26, the discharge section 38 may be positioned in the nip position P1. The discharge section 38 may discharge the cut medium 15 by nipping the medium 15 between the discharge roller 41 and the driven roller 42. When the cutting section 26 does not cut the medium 15, the discharge section 38 may be located in the non-nip position P2. The discharge section 38 may discharge the uncut long medium 15 by using the discharge roller 41.

As shown in FIG. 2, the discharge mechanism 27 may have a detection section 45, a mounting detection member 46, a spring 47, a contact member 48, and a detection auxiliary member 49. The detection section 45 is, for example, a photoelectric sensor including a light emitting section and a light receiving section. The detection section 45 may detect displacement of the mounting detection member 46, the contact member 48, and the detection auxiliary member 49. The detection section 45 of this embodiment detects the displacement of each member according to whether the optical axis 51 is blocked or not. In the following description, a state where the optical axis 51 is blocked is also referred to as a "detection state", and a state where the optical axis 51 is not blocked is also referred to as a "non-detection state".

Figure 3:
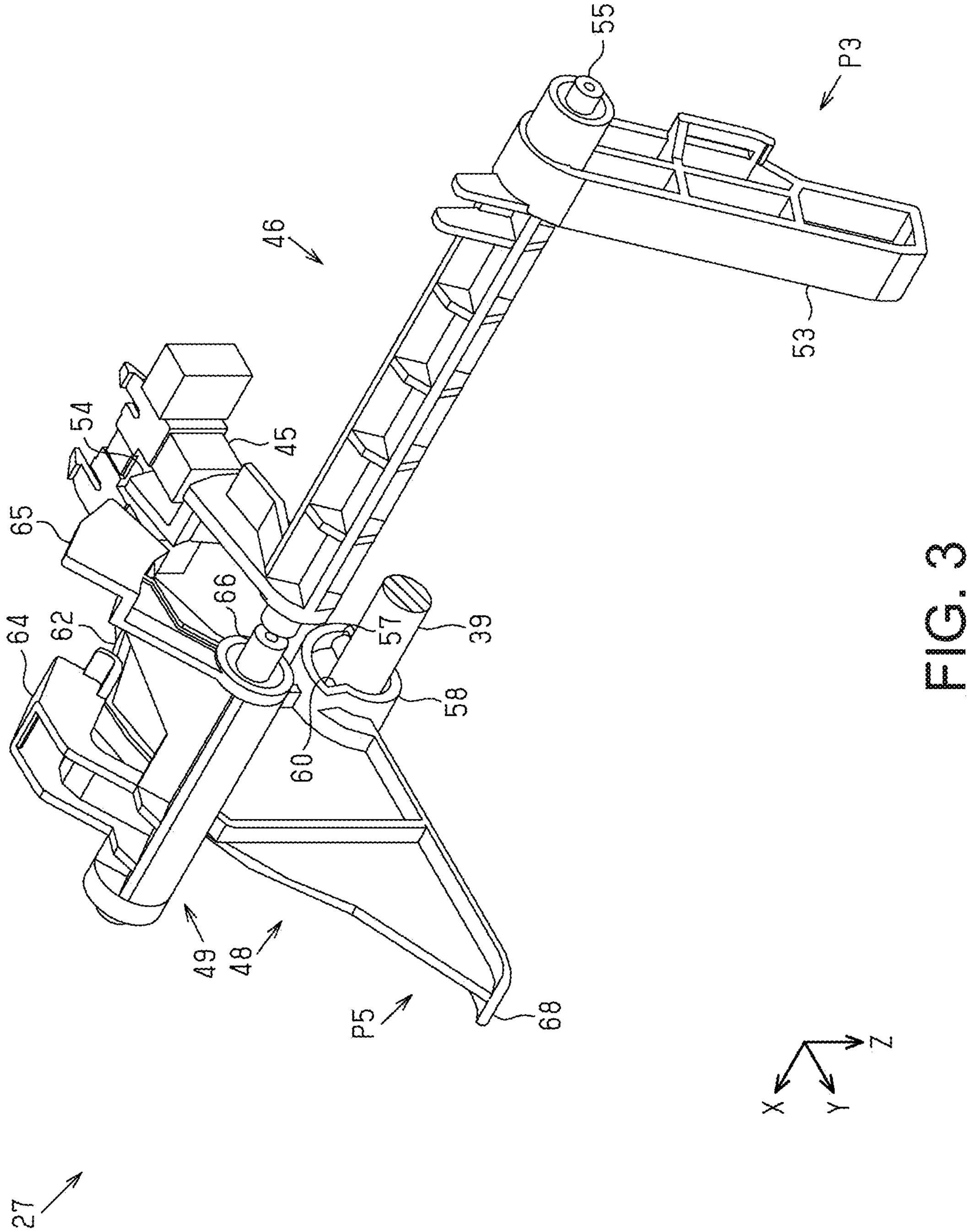
FIG. 3 is a perspective view of the discharge mechanism in which the mounting detection member is positioned in the non-mounting position.

As shown in FIG. 3, the mounting detection member 46 may have a first lever 53 and a first flag 54. The mounting detection member 46 is displaced by the attachment and detachment of the medium accommodation device 12. The mounting detection member 46 of this embodiment is provided so as to be pivotable around the first shaft 55. The mounting detection member 46 pivots by the attachment and detachment of the medium accommodation device 12.

As shown in FIGS. 2 and 3, when the medium accommodation device 12 is not attached to the recording device 13, the mounting detection member 46 is positioned at a non-mounting position P3. When the mounting detection member 46 is positioned at the non-mounting position P3, the first flag 54 blocks the optical axis 51. In other words, when the medium accommodation device 12 is not attached, the mounting detection member 46 is in a position where the mounting detection member 46 can be detected by the detection section 45.

Figure 4:
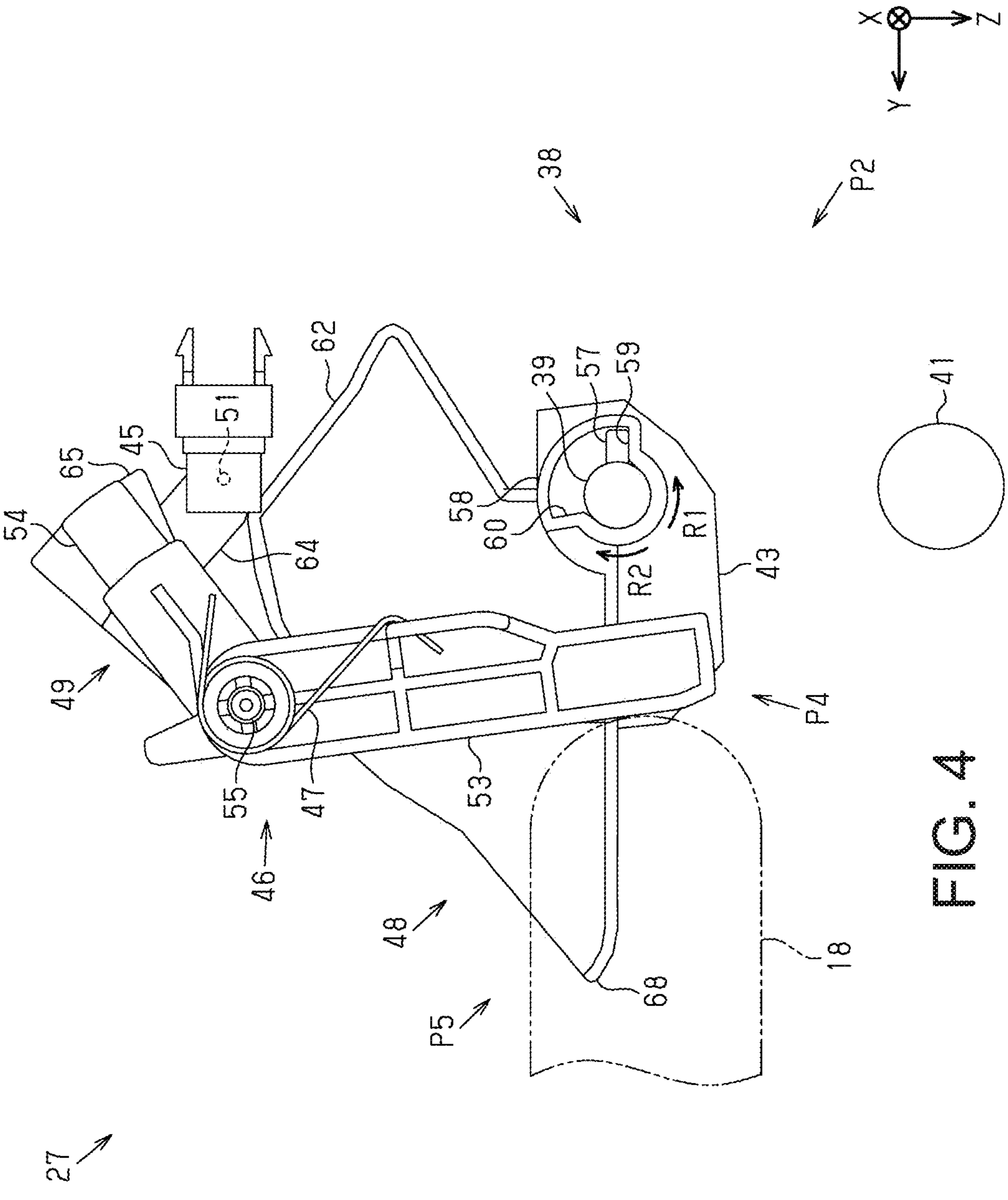
FIG. 4 is a side view of the discharge mechanism in which the mounting detection member is positioned in the mounting position.

As shown in FIG. 4, when the medium accommodation device 12 is attached to the recording device 13, the arm 18 pushes the first lever 53. The mounting detection member 46 moves to a mounting position P4 by pivoting around the first shaft 55. If the mounting detection member 46 moves to the mounting position P4, the first flag 54, which pivots around the first shaft 55, is distant far apart from the detection section 45. In other word, when the medium accommodation device 12 is attached, the mounting detection member 46 is in a position where the mounting detection member 46 cannot be detected by the detection section 45. When the discharge section 38 is positioned in the non-nip position P2, the detection section 45 detects that the mounting detection member 46 has changed from the detection state to the non-detection state. By this, the recording device 13 can detect that the medium accommodation device 12 was attached.

The spring 47 pushes the mounting detection member 46, which is in the mounting position P4, toward the non-mounting position P3. Therefore, when the medium accommodation device 12 is detached from the recording device 13, the mounting detection member 46 returns to the non-mounting position P3.

The pivot shaft 39 has a protrusion 57. The protrusion 57 engages with the contact member 48.

The contact member 48 is provided with a swing restriction section 58. The protrusion 57 may be provided within the swing restriction section 58. The contact member 48 can swing by contacting the medium 15 being discharged from the discharge port 29, but the swing restriction section 58 restricts a range of swing of the contact member 48 by engaging with the protrusion 57. The swing restriction section 58 may have a first wall 59 and a second wall 60. The protrusion 57 changes its position around the pivot shaft 39 as the pivot shaft 39 pivots. If the position of the protrusion 57 changes, the position where the protrusion 57 and the swing restriction section 58 engage will change. Thus, the position at which the contact member 48 can swing changes.

The contact member 48 swings around the pivot shaft 39. The contact member 48 is not fixed to the pivot shaft 39. The contact member 48 slides with respect to the pivot shaft 39. The contact member 48 is pivotally supported by the pivot shaft 39 at a different position from the center of gravity of the contact member 48. The contact member 48 tries to pivot so that the portion that contacts the medium 15 moves down. However, depending on the position of the protrusion 57, the pivot of the contact member 48 may be restricted. For example, by contacting the first wall 59 of the swing restriction section 58 with the protrusion 57, the pivoting of the contact member 48 can be restricted so that the portion in contact with the medium 15 does not lower. The contact member 48 may have a contact surface 62. The contact surface 62 contacts the detection auxiliary member 49.

As shown in FIG. 3, the detection auxiliary member 49 may have a second lever 64 and a second flag 65. The detection auxiliary member 49 comes into contact with the contact member 48. Specifically, the second lever 64 of the detection auxiliary member 49 comes into contact with the contact surface 62. The term "contact" means to touch as if to hit. The detection auxiliary member 49 is displaced in conjunction with the displacement of the contact member 48. The detection auxiliary member 49 of this embodiment is provided so as to be pivotable around a second shaft 66. The detection auxiliary member 49 pivots in conjunction with the displacement of the contact member 48.

The first shaft 55 and the second shaft 66 can pivot separately. The first shaft 55 and the second shaft 66 may be provided so that their axis lines are aligned in a straight line. The mounting detection member 46 may be supported on the same axis line as the detection auxiliary member 49. The mounting detection member 46 and the detection auxiliary member 49 may be supported on a different axis line from the pivot shaft 39.

As shown in FIG. 4, when the discharge section 38 is positioned in the non-nip position P2, the detection auxiliary member 49 may be in a position where the detection auxiliary member 49 cannot be detected by the detection section 45. When the discharge section 38 is positioned in the nip position P1, the detection auxiliary member 49 can move between a position that can be detected by the detection section 45 and a position that cannot be detected by the detection section 45.

In the state shown in FIG. 4, the contact member 48 is positioned in the initial position P5. The protrusion 57 causes the contact member 48 to be placed in the initial position P5 by pushing the first wall 59. The second lever 64 of the detection auxiliary member 49 contacts the contact surface 62. The second flag 65 of the detection auxiliary member 49 is positioned above the detection section 45. The second flag 65 does not block the optical axis 51.

In other words, when the medium accommodation device 12 is attached to the recording device 13 and the mounting detection member 46 moves to the mounting position P4, the detection section 45 becomes the non-detection state, which does not detect the first flag 54 and the second flag 65, and can detect that the medium accommodation device 12 was attached. When it detects that the medium accommodation device 12 is attached, the control section 21 pivots the pivot shaft first rotation direction R1. When the pivot shaft 39 pivots in the first rotation direction R1, the discharge mechanism 27 becomes a state shown in FIG. 5. Even when the pivot shaft 39 pivots in the first rotation direction R1, the mounting detection member 46 remains in the mounting position P4.

Figure 5:
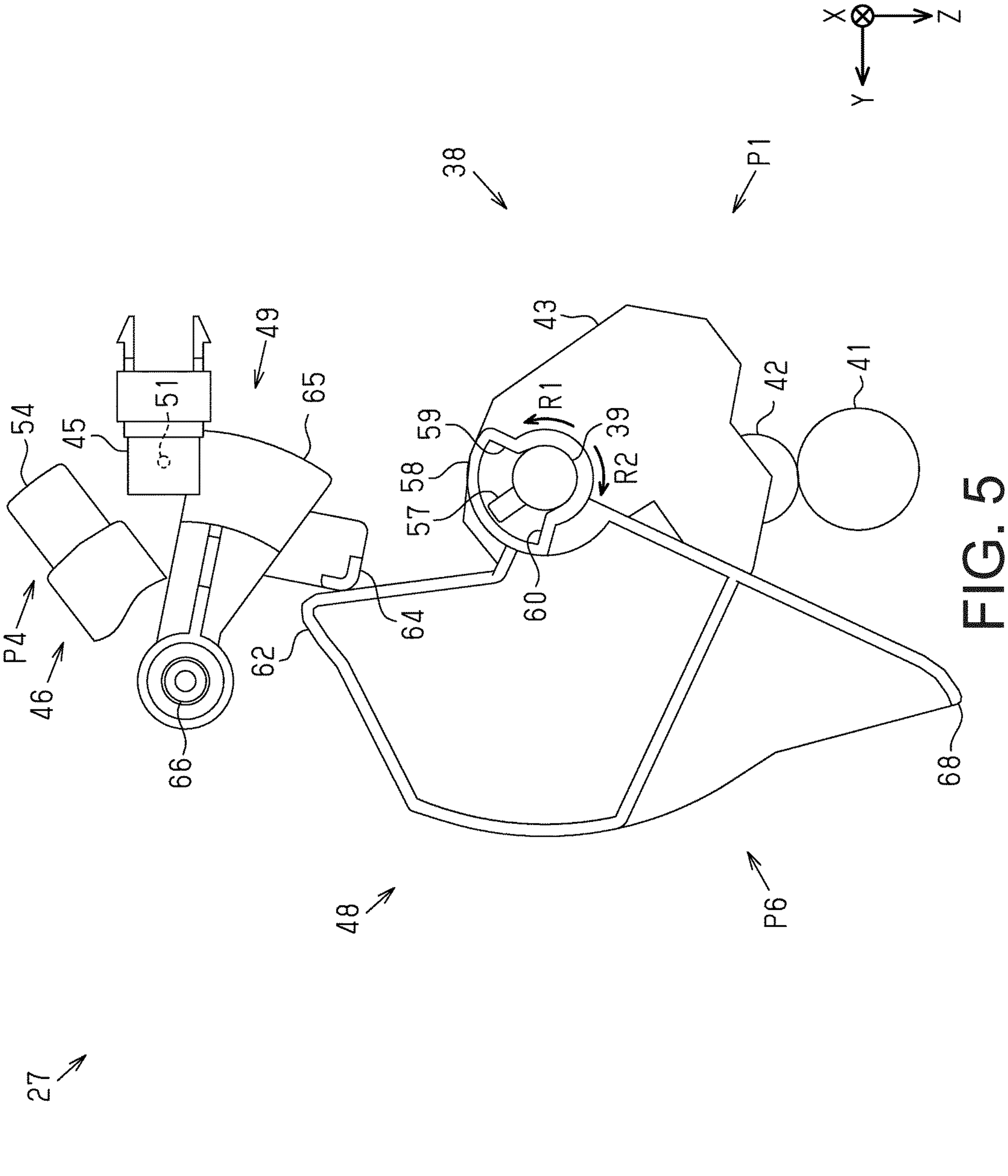
FIG. 5 is a side view of the discharge mechanism in which the contact member is positioned in a lower limit position.

As shown in FIG. 5, if the pivot shaft 39 pivots in the first rotation direction R1, the holding section 43 and the protrusion 57 pivot together with the pivot shaft 39. The holding section 43 moves the driven roller 42 to the nip position P1.

A swingable range of the contact member 48, when swinging around the pivot shaft 39, is from the position where the first wall 59 contacts the protrusion 57 to the position where the second wall 60 contacts the protrusion 57. Therefore, when the pivot shaft 39 pivots and the position of the protrusion 57 changes, the swingable position of the contact member 48 will change. When the pivot shaft 39 pivots, the position of the discharge section 38 changes. Therefore, the swingable position of the contact member 48 changes when the discharge section 38 is positioned in the nip position P1 or in the non-nip position P2. In other words, the position where pivoting is restricted by the first wall 59 or the second wall 60 with respect to the protrusion 57 changes around the axis of the pivot shaft 39. Therefore, the position of the angle that restricts the pivot of the contact member 48 around the pivot shaft 39 changes.

When the discharge section 38 changes from the state of being positioned in the non-nip position P2 to the state of being positioned at the nip position P1, the protrusion 57 pivots and separates from the first wall 59, and the contact member 48 lowers its tip end portion 68 by its own weight. The contact member 48 may be restricted from pivoting in the first rotation direction R1 by moving to a lower limit position P6 and hitting the positioning section (not shown). At this time, an angle at which the contact member 48 pivots may be smaller than an angle at which the pivot shaft 39 can pivot. The protrusion 57 may be separated from the first wall 59. The protrusion 57 may also be separated from the second wall 60.

The detection auxiliary member 49 moves along the contact surface 62 of the contact member 48, which pivots. The detection auxiliary member 49 pivots around the second shaft 66, and the second flag 65 passes through the detection section 45. When the contact member 48 is positioned at the lower limit position P6, the second flag 65 of the detection auxiliary member 49 is positioned below the detection section 45. The second flag 65 does not block the optical axis 51. Therefore, when the second flag 65 passes through the detection section 45, the detection section 45 switches its state in the following order: non-detection state, detection state, and non-detection state.

The second flag 65 and the first flag 54 can independently pivot around the second shaft 66 or the first shaft 55, respectively, and can independently pass through the detection section 45. The second flag 65 and the first flag 54 are facilitated for adjustment, and the like, because they use the same detection section 45 and pivot around the same axis line.

The contact member 48 at the lower limit position P6 can contact the medium 15 to be discharged. In other words, the contact member 48 can be positioned at a position where the medium 15 to be discharged passes through.

Figure 6:
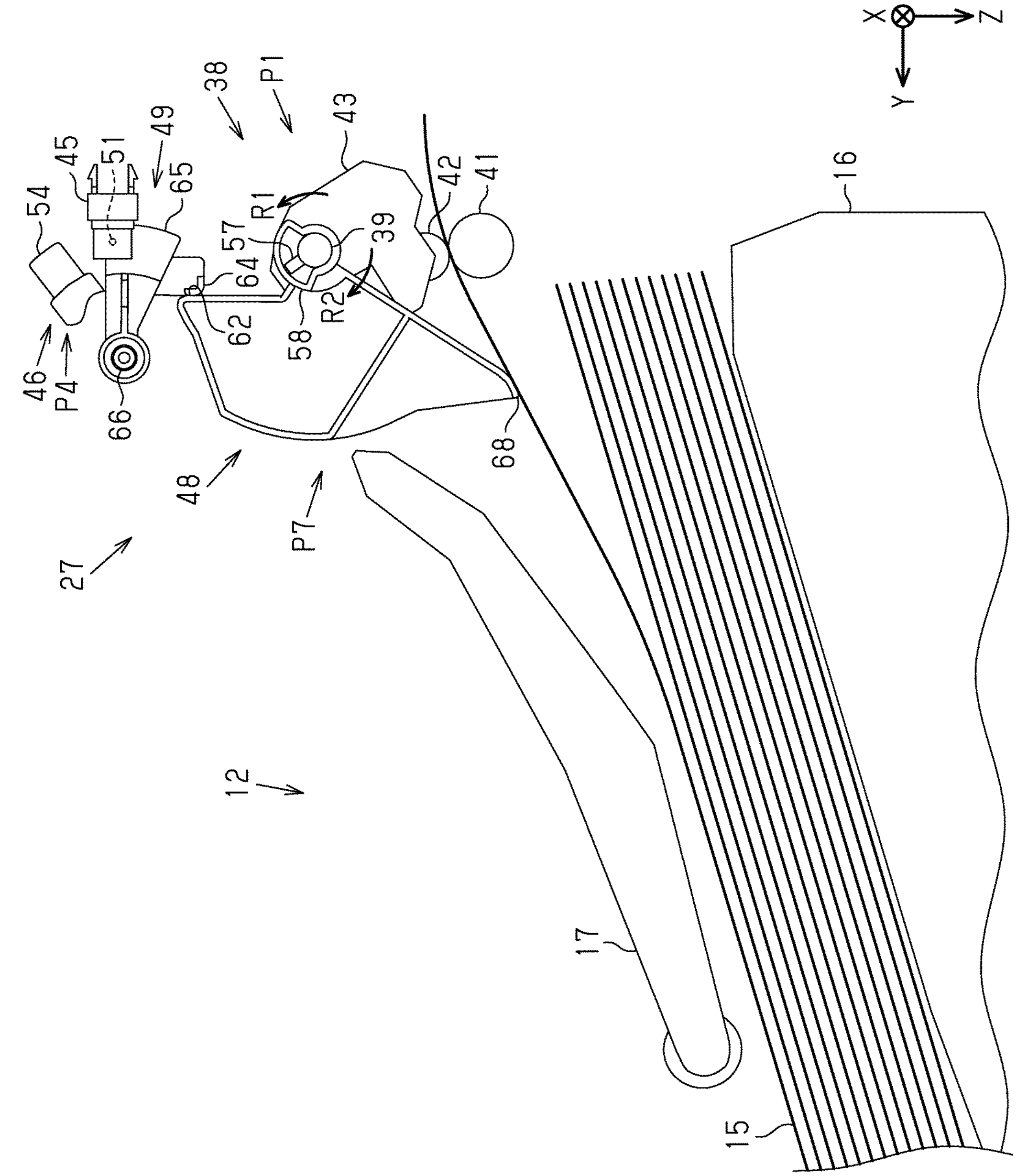
FIG. 6 is a side view of the discharge mechanism that discharges a medium.

As shown in FIG. 6, the contact member 48 that is hit by the medium 15 moves to a detection position P7 by pivoting in the second rotation direction R2. When the contact member 48 is positioned at the detection position P7, the second flag 65 of the detection auxiliary member 49 blocks the optical axis 51. The detection section 45 becomes the detection state.

The pivot shaft 39 may be displaced by nipping the medium 15 with the discharge section 38. When the discharge section 38 is positioned in the nip position P1, the discharge roller 41 and the driven roller 42 nip the medium 15, then the driven roller 42 is displaced to separate from the discharge roller 41 by a thickness of the medium 15. The holding section 43 also tries to be displaced by being pushed by the displacement of the driven roller 42. By this, the pivot shaft 39, which fixes the holding section 43, is also pushed. Therefore, the pivot shaft 39 may be able to be displaced in a direction that separates from the discharge roller 41 by the thickness of the medium 15. When the discharge section 38 is pivoted to the nip position P1, the contact surface 62 may be formed along a direction in which the pivot shaft 39 is being displaced by nipping the medium 15 with the discharge section 38. In other words, the contact surface 62 of the contact member 48 and the second lever 64 of the detection auxiliary member 49 are in contact with each other as to slide along a direction in which the pivot shaft 39 is displaced by nipping the medium 15. Since the detection auxiliary member 49 pivots around a different axis line from the pivot shaft 39, the displacement of the pivot shaft 39 does not affect the pivot of the detection auxiliary member 49.

As shown in FIG. 5, when the medium 15 passes through the discharge mechanism 27 and is distant apart from the contact member 48, the contact member 48 returns to the lower limit position P6. Therefore, the detection section 45 becomes in the non-detection state.

However, when medium 15 remains in the discharge section 38, when medium 15 discharged onto the medium accommodation device 12 is deformed and is in contact with the contact member 48, or when medium 15 is stacked in the discharge tray 16 in excess of the maximum allowable capacity, the medium 15 may remain in contact with the contact member 48. In other words, the detection section 45 may not return to the non-detection state. If the detection section 45 does not return to the non-detection state when the discharge section 38 discharges the medium 15, it can be determined that the medium 15 can no longer be discharged onto the medium accommodation device 12. The control section 21 may stop the recording if the detection section 45 does not become the non-detection state at the timing in which the recorded medium 15 is being discharged.

Operations of Embodiment

The operation of the present embodiment will be described.

When the medium accommodation device 12 is attached, the detection section 45 becomes the non-detection state. When the medium accommodation device 12 is detached, the detection section 45 becomes the detection state. Therefore, the detection section 45 can detect the attachment and detachment of the medium accommodation device 12.

While the medium accommodation device 12 is attached, the detection section 45 does not perform detection of the mounting detection member 46. Therefore, the detection section 45 can detect a displacement of the detection auxiliary member 49. In other words, the detection section 45 detects the medium 15 while the medium accommodation device 12 is attached. When the medium accommodation device 12 is not attached, the detection section 45 does not detect the medium 15.

Effects of Embodiment

The effects of this embodiment will be described.

(1-1) By pivoting the pivot shaft 39 with the protrusion 57, the swingable position of the contact member 48 can be changed. Therefore, since the recording device 13 can be configured with fewer parts, the medium 15 can be detected with a simple configuration.

(1-2) The detection section 45 detects the detection auxiliary member 49 that is displaced in conjunction with the contact member 48. Therefore, the flexibility in the placement of the detection section 45 can be increased.

(1-3) The detection auxiliary member 49 rotates in conjunction with the displacement of the contact member 48. Therefore, the detection auxiliary member 49 can be easily displaced.

(1-4) When the discharge section 38 nips the medium 15, the pivot shaft 39 may be displaced by the thickness of the medium 15. In this regard, since the contact surface 62 is formed along the direction in which the pivot shaft 39 is displaced, the displacement of the pivot shaft 39 can be passed on.

(1-5) When the discharge section 38 is positioned at the non-nip position P2, the detection auxiliary member 49 is in a position where the detection auxiliary member 49 cannot be detected by the detection section Therefore, when the discharge section 38 is positioned at the non-nip position P2, the detection section 45 can be used for detecting other than the detection auxiliary member 49.

(1-6) The detection section 45 detects the displacement of the mounting detection member 46. The mounting detection member 46 is displaced by the attachment and detachment of the medium accommodation device 12. Therefore, the detection section 45 can detect the medium 15 being discharged and the attachment and detachment of the medium accommodation device 12.

(1-7) The mounting detection member 46 is detected by the detection section 45 when the medium accommodation device 12 is not attached. The mounting detection member 46 is displaced when the medium accommodation device 12 is attached. In other words, the mounting detection member 46 can be displaced to a position where it is not detected by the detection section 45 by attaching the medium accommodation device 12.

(1-8) The mounting detection member 46 and the detection auxiliary member 49 are supported on the same axis line and are detected by the same detection section 45. Therefore, the detection of the mounting detection member 46 and the detection auxiliary member 49 can be stabilized.

Modifications

This embodiment can be implemented with the following modifications. This embodiment and the following modification examples can be implemented in combination with each other to the extent that they are not technically inconsistent.

The mounting detection member 46 may be provided so as to be slidable with respect to the first shaft 55. The detection auxiliary member 49 may be provided so as to be slidable with respect to the second shaft 66. If at least one of the mounting detection member 46 and the detection auxiliary member 49 slides with respect to a shaft, the first shaft 55 and the second shaft 66 may be configured as a single component.

The first shaft 55 and the second shaft 66 may be provided at an arbitrary position. The first shaft 55 and the second shaft 66 may not be parallel to each other.

The mounting detection member 46 may move in a sliding movement by attaching and detaching the medium accommodation device 12.

The recording device 13 may have a plurality of detection sections 45. The recording device 13 may have a detection section 45 that detects a displacement of the mounting detection member 46 and a detection section 45 that detects a displacement of the detection auxiliary member 49.

When the medium accommodation device 12 is not attached, the mounting detection member 46 may be in a position where the mounting detection member 46 cannot be detected by the detection section 45. When the medium accommodation device 12 is attached, the mounting detection member 46 may be in a position where the mounting detection member 46 can be detected by the detection section 45.

The recording device 13 may be configured not to have the mounting detection member 46. The detection section 45 may not detect the displacement of the mounting detection member 46. The detection section 45 may directly detect the attached medium accommodation device 12.

When the discharge section 38 is positioned in the non-nip position P2, the detection auxiliary member 49 may be in a position where the detection auxiliary member 49 can be detected by the detection section 45.

The contact surface 62 may be formed along a direction different from the direction in which the pivot shaft 39 is displaced when the driven roller 42 in the nip position P1 nips the medium 15 between the driven roller 42 and the discharge roller 41.

The detection auxiliary member 49 may move with a slide movement in conjunction with the displacement of the contact member 48.

The discharge mechanism 27 may be configured not to have the detection auxiliary member 49. The detection section 45 may directly detect the contact member 48.

The discharge roller 41 may be held by the holding section 43. The discharge roller 41 may move to the nip position P1 or the non-nip position P2 together with the driven roller 42.

The recording device 13 is not limited to an inkjet printer, and may be a laser printer, a thermal printer, a dot impact printer, a digital printer, or the like.

The recording device 13 may be a liquid injection device that performs recording by injection or ejecting liquid other than ink. The state of the liquid which is ejected from the liquid injection device as a minute amount of liquid droplets includes a granular shape, a tear-drop like shape, and a shape with thread-like tail. The "liquid" here should be any material that can be injected from the liquid injection device. For example, the liquid may be in a state where a substance is in a liquid phase, and includes a fluid body such as a liquid body having high or low viscosity, a sol, gel water, other inorganic solvent, an organic solvent, a solution, a liquid resin, a liquid metal, and a metallic melt. The liquid includes not only a liquid as one state of a substance but also a liquid in which particles of a functional material made of a solid material such as a pigment or metallic particles are dissolved, dispersed, or mixed in a solvent. Typical examples of the liquid include ink and liquid crystal as described in the above embodiment. Here, the ink includes various liquid compositions such as general water-based ink, oil-based ink, gel ink, and hot-melt ink. As a specific example of the liquid injection device, for example, there is a device that injects liquid containing a material such as an electrode material or a color material used for manufacturing a liquid crystal display, an electroluminescent display, a surface-emitting display, a color filter, or the like in a dispersed or dissolved form. The liquid injection device may be a device that injects a bioorganic material used for biochip production, a device that is used as a precision pipette and injects a liquid serving as a sample, a textile print device, a micro dispenser, or the like. The liquid injection device may be a device that injects lubricant oil to a precision instrument such as a watch or a camera in a pinpoint manner, or a device that injects a transparent resin solution such as an ultraviolet-curing resin onto a substrate in order to form a micro hemispherical lens, an optical lens, or the like used in an optical communication element or the like. The liquid injection device may be a device that injects etchant such as an acid or an alkali for etching a substrate or the like.

Definition

The expression "at least one" as used herein means "one or more" of the desired options. As an example, the expression "at least one" as used herein means "only one option" or "both of the two options" if the number of options is two. As another example, the expression "at least one" as used herein means "only one option," "any combination of two options," or "any combination of three or more options" if the number of options is three or more.

Note

Hereinafter, technical ideas grasped from the above described embodiment and modifications, and operations and effects thereof will be described.

(A) A recording device includes a recording section that performs recording on a medium; a discharge section that nips and discharges the medium that was recorded on; a pivot shaft that pivots the discharge section between a nip position, where the medium is nippable, and a non-nip position, where the medium is not nippable; a contact member that is configured to swing around the pivot shaft and to contact the medium to be discharged; and a detection section that detects displacement of the contact member, wherein the pivot shaft has a protrusion that engages with the contact member, the contact member is provided with a swing restriction section that restricts range of swing by engaging with the protrusion, a position where the protrusion engages with the swing restriction section changes with pivoting of the pivot shaft, and a position where the contact member is swingable changes between when the discharge section is positioned in the nip position and when the discharge section is positioned in the non-nip position.

According to this configuration, by pivoting the pivot shaft with the protrusion, the swingable position of the contact member can be changed. Therefore, since the recording device can be configured with fewer parts, the medium can be detected with a simple configuration.

(B) The recording device described in (A) may further include a detection auxiliary member that is in contact with the contact member and is displaced in conjunction with displacement of the contact member, wherein the detection section may detect the detection auxiliary member.

According to this configuration, the detection section detects the detection auxiliary member that is displaced in conjunction with the contact member. Therefore, flexibility in the placement of the detection section can be increased.

(C) According to the recording device described in (B), the detection auxiliary member may be supported on an axis line different from the pivot shaft, and may pivot in conjunction with the displacement of the contact member.

According to this configuration, since the detection auxiliary member pivots in conjunction with the displacement of the contact member, the detection auxiliary member can be easily displaced.

(D) According to the recording device described in (B) or (C), the contact member may have a contact surface that contacts the detection auxiliary member, and the contact surface may be formed so that the contact surface is along a direction in which the pivot shaft of the discharge section is displaced by nipping the medium, when the discharge section is positioned at the nip position.

When the discharge section nips the medium, the pivot shaft may be displaced by the thickness of the medium. In this regard, according to this configuration, since the contact surface is formed along the direction in which the pivot shaft is displaced, so that the displacement of the pivot shaft can be passed on.

(E) According to the recording device described in (B) through (D), when the discharge section is positioned in the non-nip position, the detection auxiliary member may be at a position where the detection auxiliary member cannot be detected by the detection section.

According to this configuration, when the discharge section is positioned in the non-nip position, the detection auxiliary member is in a position where the detection auxiliary member cannot be detected by the detection section. Therefore, when the discharge section is positioned in the non-nip position, the detection section can be used for detecting other than the detection auxiliary member.

(F) The recording device described in (A) through (E) may further include a mounting detection member that is displaced by attachment or detachment of a medium accommodation device that stacks the medium being discharged, wherein the detection section may detect a displacement of the mounting detection member.

According to this configuration, the detection section detects the displacement of the mounting detection member. The mounting detection member is displaced by attaching and detaching the medium accommodation device. Therefore, the detection section can detect the medium being discharged and the attachment and detachment of the medium accommodation device.

(G) According to the recording device described in (F), when the medium accommodation device is not attached, the mounting detection member may be in a position where the mounting detection member can be detected by the detection section.

According to this configuration, the mounting detection member is detected by the detection section when the medium accommodation device is not attached. The mounting detection member is displaced when the medium accommodation device is attached. In other words, the mounting detection member can be displaced to a position where the mounting detection member cannot be detected by the detection section by attaching the medium accommodation device.

(H) The recording device described in (C) through (E) may further include a mounting detection member that is displaced by attachment or detachment of a medium accommodation device that stacks the medium being discharged, wherein the detection section detects displacement of the mounting detection member, and the mounting detection member may be supported on the same axis line as the detection auxiliary member, and may pivot by attaching or detaching the medium accommodation device.

According to this configuration, the mounting detection member and the detection auxiliary member are supported on the same axis line and are detected by the same detection section. Therefore, the detection of the mounting detection member and the detection auxiliary member can be stabilized.

What is claimed is:

1. A recording device comprising:

a recording section that performs recording on a medium;

a discharge section that nips and discharges the medium that was recorded on;

a pivot shaft that pivots the discharge section between a nip position, where the medium is nippable, and a non-nip position, where the medium is not nippable;

a contact member that is configured to swing around the pivot shaft and to contact the medium to be discharged; and a detection section that detects displacement of the contact member, wherein the pivot shaft has a protrusion that engages with the contact member, the contact member is provided with a swing restriction section that restricts range of swing by engaging with the protrusion, a position where the protrusion engages with the swing restriction section changes with pivoting of the pivot shaft, and a position where the contact member is swingable changes between when the discharge section is positioned in the nip position and when the discharge section is positioned in the non-nip position.

2. The recording device according to claim 1, further comprising:

a detection auxiliary member that is in contact with the contact member and is displaced in conjunction with displacement of the contact member, wherein the detection section detects the detection auxiliary member.

3. The recording device according to claim 2, wherein the detection auxiliary member is supported on an axis line different from the pivot shaft, and pivots in conjunction with displacement of the contact member.

4. The recording device according to claim 2, wherein the contact member has a contact surface that contacts the detection auxiliary member and the contact surface is formed so that the contact surface is, when the discharge section is positioned at the nip position, along a direction in which the pivot shaft is displaced as the discharge section nips the medium.

5. The recording device according to claim 2, wherein when the discharge section is positioned in the non-nip position, the detection auxiliary member is in a position where the detection auxiliary member is not detectable by the detection section.

6. The recording device according to claim 1, further comprising:

a mounting detection member that is displaced by attachment or detachment of a medium accommodation device that stacks the medium being discharged, wherein the detection section detects displacement of the mounting detection member.

7. The recording device according to claim 6, wherein when the medium accommodation device is not attached, the mounting detection member is in a position where the mounting detection member is detectable by the detection section.

8. The recording device according to claim 3, further comprising:

a mounting detection member that is displaced by attachment or detachment of a medium accommodation device that stacks the medium being discharged, wherein the detection section detects displacement of the mounting detection member, and the mounting detection member is supported on the same axis line as the detection auxiliary member, and pivots by attachment or detachment of the medium accommodation device.

* * * * *